1632X
J. BOUIS.
Steam Cooking Stove.
Patented Jan'y 6, 1812.
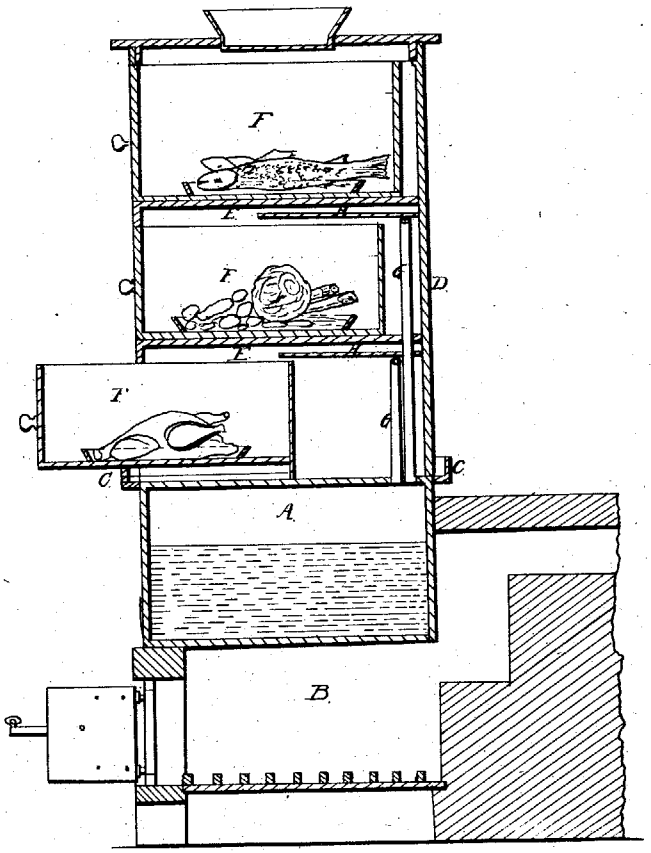
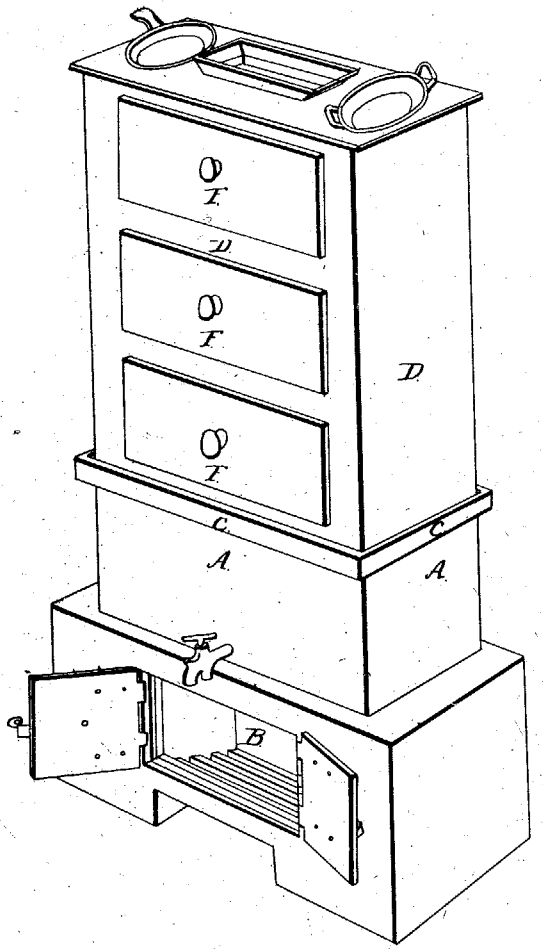

John Bones

Letters Patent

The Schedule referred to in these Letters Patent and making part of the same containing a description in the words of the said John Bone himself of his Steam drawer Kitchen or apparatus for Cooking.

This invention consists in so distributing the vessels used in cooking by steam over each other that animal food vegetables and fish may be cooked at the same time and each attended to without interrupting the process of cook-ing in the others. The following is a description of the several parts of the apparatus.

The boiler is a rectangular vessel of such width length and depth as shall fit for the reception of the Steamer above and to contain water enough to supply the evaporation during the time required for Cooking. It may be made of cast iron or other metal and fixed in brick or stone work over a fire place for wood or coal in the manner thought most proper for communicating the heat necessary to produce and support the boiling and evaporating of steam. Around the rim or margin of the boiler is a projecting channel or gutter upon which the Steamer rests. This gutter is filled with water to prevent the escape of steam during the time of Cooking. The Steamer or exterior case thereof rests on the boiler as above described and is of the same length and breadth so as to fit the boiler so well that the water which is poured into the gutter surrounding it will not descend.

It is constructed of tin copper or other metal or proper material and is of such height as to contain the separating bottoms and steaming drawers for the various descriptions of Cooking hereafter mentioned. There is a bottom to this exterior case of the steamer through which the steam from the boiler rises ~~by pipes tubes or apertures so high as~~ that there is space sufficient for the reception of condensed [illegible] or the gravy from the meat in the drawer above to be contained. Over the top of these steam pipes or openings but not in contact therewith are plates of metal to prevent the immediate rising of the Steam and to diffuse it equally over the whole surface
of the Steaming drawer that rests thereon. The first or lower Steaming drawer
that rests thereon. The first or lower Steaming drawer is made to slide into the
case above described on the first bottom or horizontal division. This drawer has
its front back and sides of tin or other metal and also the bottom and has one or
more strong divisions to separate the various kinds of animal food to be cooked
in there by Steam at the same time. The bottom is perforated with holes to
admit the Steam freely to ascend. This drawer is of such depth as shall admit
articles usually cooked by Steam to lye therein. Immediately above this
drawer lies another horizontal floor bottom or pan connected with the case
and has apertures or pipes for the Steam to rise through as in the bottom
above described which receives the water that descends from the vegetables
in the Steaming drawer above and prevents its descent into the drawer
containing the animal substances. The second drawer is for vegetables
and is constructed like that for animal substances below with divisions
for the different kinds.

Above it is another bottom or partition connected with
the outside case for the reception of the liquor which descends from the fish
Steamer above this bottom forming part of the fish Steamer and through which
the Steam rises as above described. This fish Steamer is of the same size
as the lower part of the case and may either rest on it over the vegetables
or be placed immediately over the Kettle, over these is a cover that either
goes upon the case over the vegetables or over the fish steamer. In this case
the holes are perforated for the admission of the bottoms of the same pans
either for melting butter or making gravys. There are outside [illegible] handles
to the case and fish Steamer by which they are removed from the fire at pleasure. The
waste Steam may pass off through the apertures for the same pans in
the cover or the other small openings at the edges of the drawers, or there
may be a safety valve in the top at the pleasure of the constructor.

In the Kettle is a cock for the
discharge of the water which can be used for any purpose that hot
water is required for. The great advantages of this invention are
the small space it occupies as the Kettle need not be more than the last in length and perfect Mill for a large family, it takes but little fuel, and every part of the process of cleaning can be examined by looking into the steam chamber without interrupting the business in the mills.

Witnesses

William Hunter

Geo Lyon

John Bell

Exd.

[illegible]

[illegible]